United States Patent [19]

Noda et al.

[11] Patent Number: 4,972,282
[45] Date of Patent: Nov. 20, 1990

[54] HEAD CARRIAGE MECHANISM OF A MAGENTIC DISC DRIVE INCLUDING A WEAR RESISTANCE, LOW FRICTION SLIDE MEMBER

[75] Inventors: Yasushi Noda, Tokyo; Takao Akiba, Omiya, both of Japan

[73] Assignee: Teac Corporation, Japan

[21] Appl. No.: 320,075

[22] Filed: Mar. 6, 1989

[30] Foreign Application Priority Data

Mar. 8, 1988 [JP] Japan ............................. 63-29779[U]

[51] Int. Cl.$^5$ .......................... G11B 5/55; G11B 21/08; G11B 15/60
[52] U.S. Cl. .................................... 360/106; 360/104; 360/105; 360/130.3; 384/25; 384/26
[58] Field of Search ................ 360/102, 103, 106, 107, 360/109, 104, 105, 130.34, 130.3, 130.1; 384/25-26

[56] References Cited

U.S. PATENT DOCUMENTS 4,748,522  5/1988  Takahashi et al. ............. 360/104 X
4,809,107  2/1989  Hasegawa ...................... 360/106 X

FOREIGN PATENT DOCUMENTS 62-250564  10/1987  Japan ................................. 360/130.1

Primary Examiner—Stuart N. Hecker
Assistant Examiner—Alfonso Garcia
Attorney, Agent, or Firm—Andrus, Sceales, Starke & Sawall

[57] ABSTRACT

A head carriage mechanism of a magnetic recording-/reproducing apparatus including a single guide rod fixed on a frame of the apparatus, a head carriage having a first side in which the guide rod is passed through, a rack of teeth provided on the head carriage at a second side opposing the first side side, a mounting member fixed on the frame, a stepping motor provided with a pinion gear and mounted on the mounting member such that the pinion gear is meshed with the rack teeth, a leaf spring configured to have a U-shaped cross section and mounted on the mounting member such that the leaf spring makes a slide engagement with a part of the head carriage so that the rack teeth and the pinion gear are pressed to each other, and a wear resistant slide member provided at the part of the head carriage in which the leaf spring makes the slide engagement with the head carriage. The leaf spring is mounted on the mounting member with such an orientation that the leaf spring extends perpendicularly to the predetermined direction along which the head carriage is slid.

7 Claims, 6 Drawing Sheets

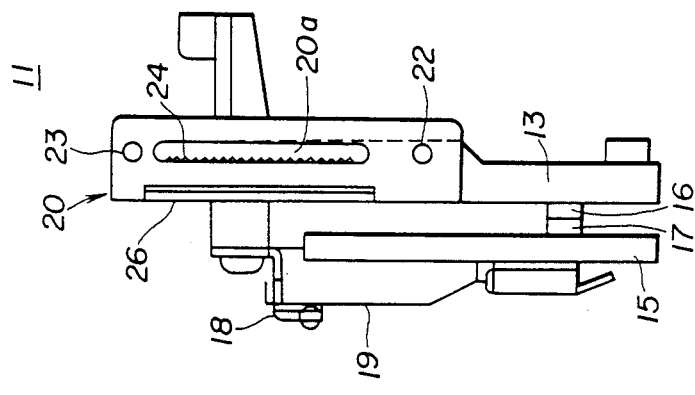
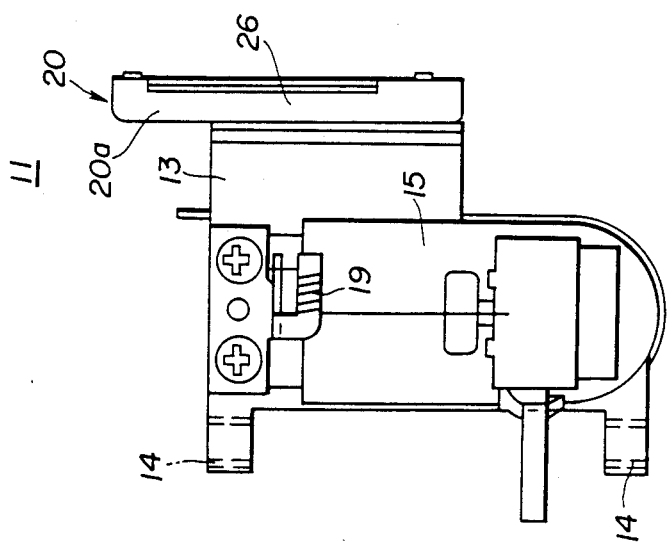

HEAD CARRIAGE MECHANISM OF A MAGENTIC DISC DRIVE INCLUDING A WEAR RESISTANCE, LOW FRICTION SLIDE MEMBER

BACKGROUND OF THE INVENTION

The present invention generally relates to head carriage mechanisms of a magnetic disk recording/reproducing apparatus recording and/or reproducing information on and from a flexible magnetic disk, and more particularly to a reliable head carriage mechanism for such an apparatus having a simple structure.

Generally, a magnetic disk recording/reproducing apparatus records and/or reproduces an information signal on and from a flexible magnetic disk using a head carriage mechanism on which a magnetic head is mounted.

Conventionally, such a head carriage mechanism has a construction in which a head carriage carrying a magnetic head is supported slidably on a pair of parallel guide rods and the moving plane or plane of transportation of the head carriage is made parallel to the recording plane of the magnetic disk When the magnetic head is transported along a recording track on the disk, the head carriage is moved along the guide rods by a drive system such as a stepping motor.

However, such a structure has a problem in that accurate positioning of the head carriage, which has to be established in order to maintain the moving plane of the head carriage at a designed predetermined position, is difficult. Because of this reason, the adjustment inevitably becomes complicated and delicate, and requires a large number of parts.

In order to avoid such a problem as well as to reduce the cost, U.S. Pat. No. 4,428,012 or Japanese Laid-open Patent Application No. 61-5481 discloses a structure using a single guide rod on which the head carriage is held slidably. In order to maintain the head carriage at a predetermined plane during the transportation of the head carriage, a pressing mechanism including a resilient member is provided so as to act between the head carriage and a base mount such as a frame or chassis of the apparatus on which the head carriage is mounted. In such a mechanism, however, it is difficult to maintain the pressing force exerted by the resilient member of the pressing mechanism uniform throughout the entire range of movement of the magnetic head As a result, frictional wear takes place at the part where the head carriage or the base mount makes a sliding engagement with the pressing mechanism. Such wear changes the position of the moving plane of the magnetic head. It will be easily understood that such a deviation in the moving plane of the magnetic head increases with increasing time.

Further, the pressing mechanism aforementioned uses a number of parts such as the resilient member, lever member, roller and various bearings to support the lever member of the roller, and therefore has a problem in that the structure is complex and the assembling work is difficult.

Furthermore, such a pressing mechanism is usually mounted on the head carriage as is disclosed in the Japanese Laid-open Patent Application No. 61-5481. In such a structure, the pressing mechanism is moved together with the movement of the head carriage. Thus, there arises another problem in that the state of engagement of the engaging part where the pressing mechanism and the base mount make a contact tends to be changed.

The structure in which the pressing mechanism is mounted on the base mount as is disclosed in the U.S. Pat. No. 4,428,012 is more advantageous in terms of the stabilization of the state of the engaging part than the structure in which the pressing mechanism is mounted on the head carriage. However, there is a problem in that the urging action depends rather sensitively on the temperature change in various parts of the apparatus. Such a temperature change may occur as a result of the heat of the stepping motor, for example. Because of this reason, it becomes necessary to provide an additional device to compensate for the temperature change in the structure. However, such a device complicates the structure of the head carriage mechanism.

SUMMARY OF THE INVENTION

Accordingly, it is a general object of the present invention to provide a novel and useful head carriage mechanism of a magnetic disk recording/reproducing apparatus in which the problems aforementioned are eliminated.

Another and more specific object of the present invention is to provide a head carriage mechanism having a structure in which a head carriage is held by a single guide rod and that a U-shaped leaf spring is used to exert a pressing force pressing a rack of teeth on a pinion gear, wherein the U-shaped leaf spring is disposed with such an orientation that a center line of the leaf spring crosses perpendicularly to the direction of transportation of the head carriage. According to the present invention, the U-shaped leaf spring can be accommodated in a small space when mounted. Further, as a result of the disposition of the U-shaped leaf spring as aforementioned, the leaf spring exhibits a large rigidity against a force applied thereto when the head carriage is transported. Thus, the leaf spring is not deformed to follow the movement of the head carriage, and a stabilized pressing force is obtained so as to press the rack teeth to the pinion gear. Accordingly, the movement of the head is stabilized.

Other objects and further features of the present invention will become apparent from the following description when read in conjunction with attached drawings.

BRIEF DESCRIPTION OF THE DRAWINGS

FIG. 1 is a front view showing a first embodiment of the head carriage mechanism of the present invention in a state in which a part thereof is sectioned;

FIG.2 is a plan view showing the mechanism of FIG.1 is a state in which a part thereof is sectioned;

FIGS.5 and 6 are respectively a plan view and a side view of the head carriage;

DETAILED DESCRIPTION

Figures 1, 2:
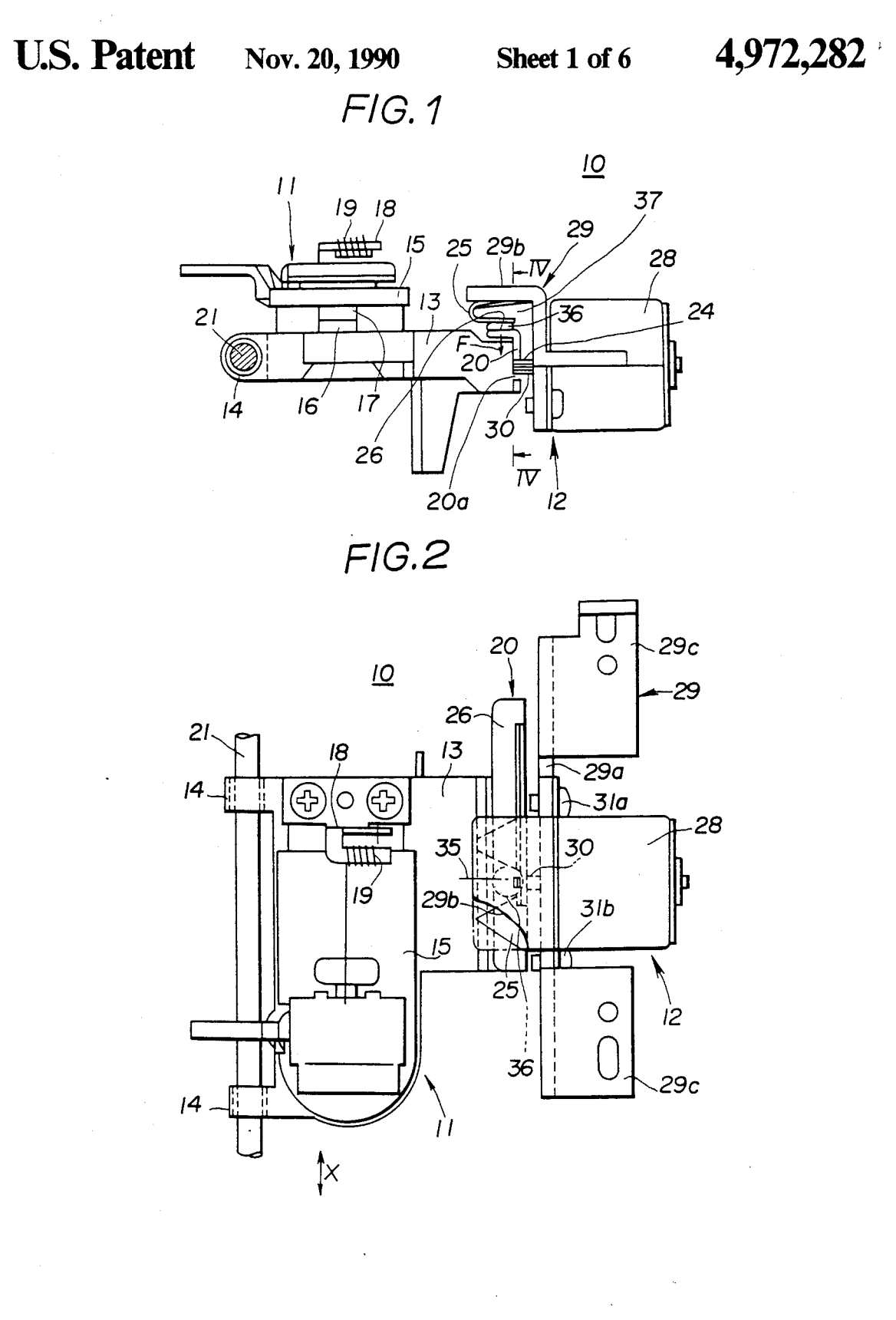
Figure 3:
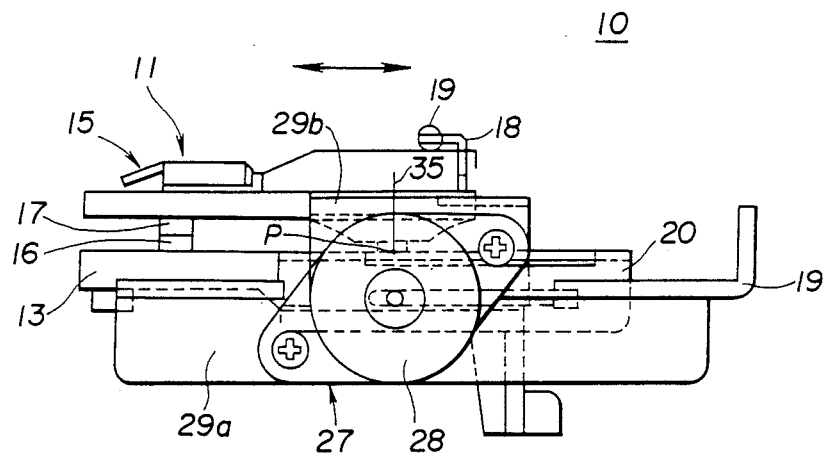
FIG. 3 is a side view showing the mechanism of FIG.1.
Figure 9:
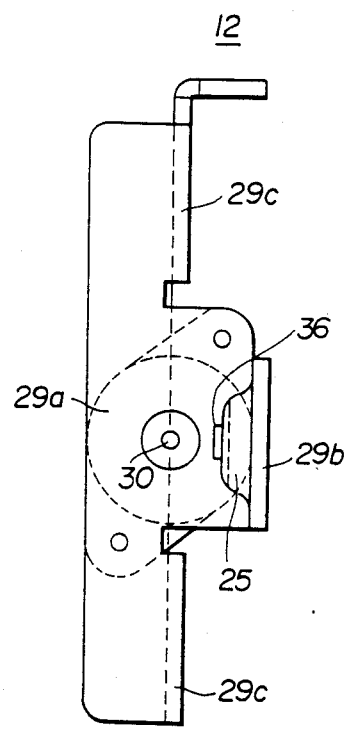
FIGS.7, 8 and 9 are respectively a plan view, a front view and a left side view showing a drive unit used in the mechanism.
Figure 7:
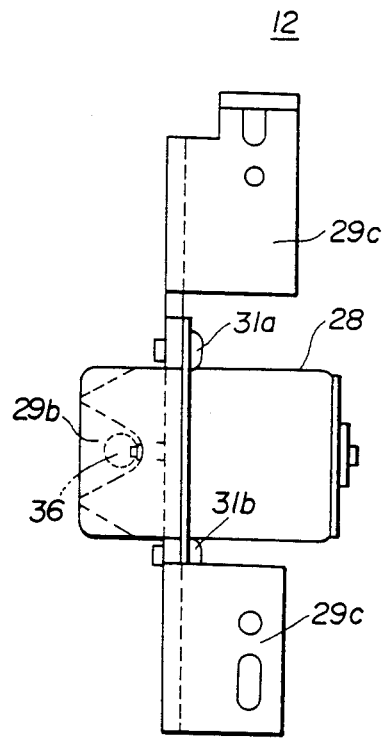
Figure 8:
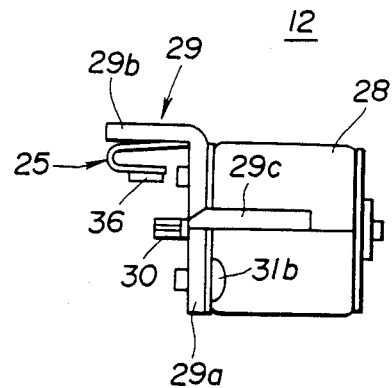

FIGS.1-3 show a first embodiment of the head carriage mechanism for a magnetic disk recording/reproducing apparatus of the present invention. The head carriage mechanism illustrated therein by a reference numeral 10 generally comprises a head carriage 11 illustrated in FIGS.5 and 6, and a drive unit 12 illustrated in FIGS.7 through 9 which is mounted on a frame (not shown) of the magnetic disk recording/reproducing apparatus.

As shown in FIGS.1-3 as well as in FIGS.5 and 6, the head carriage 11 comprises a head carriage base 13, a pair of bearing parts 14, an upper head arm 15, a lower head piece 16, an upper head piece 17, a spring holder 18, a head loading spring 19 and a rack rail 20.

The head carriage 11 is supported by a single guide rod 21 mounted on the frame of the apparatus. More specifically, the head carriage 11 is supported by the guide rod 21 by inserting the guide rod 21 to the bearing parts 14 of the head carriage base shown in FIG.5 at the left such that the rod moves slidably and rotates freely in the bearing parts 14. A metal bearing is used for the bearing part 14 in order to secure precision as well as a smooth transportation of the head. The rack rail 20 is provided on the other side of the head carriage base 13 (in the right of FIG.5).

Figure 4:
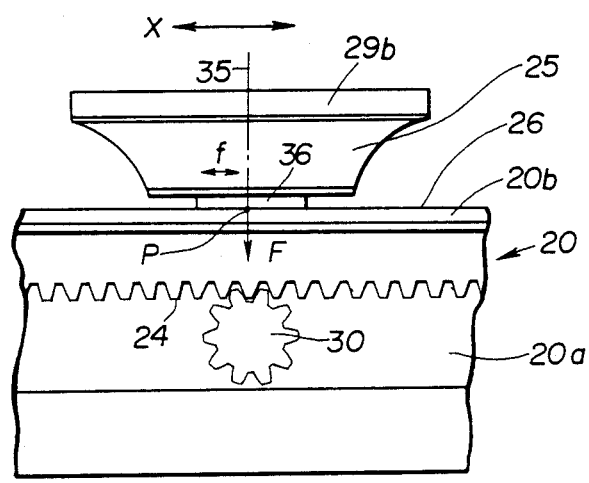
FIG.4 is an enlarged cross sectional view of the mechanism taken along a IV—IV line of FIG.1.

The rack rail 20 is an L-shaped plate like member mounted on a side of the head carriage base 13 by screws 22 and 23 (see FIG.6). Further, an elongated hole 20a is formed on a central part of the rack of rail 20, and a rack teeth is formed on one of the sides of the hole 20a as illustrated in FIG.4 in enlarged scale. A bent part 20b of the rack rail 20 which is a part different from the part of the rack of rail 20 in which the rack teeth 24 is provided has a smooth upper surface 26 on which a leaf spring 25 to be described later makes a slide engagement.

As shown in FIGS.1-3 and FIGS.7-9, the drive unit 12 comprises a stepping motor 28, a mounting member 29 and a leaf spring 25 which constitutes the essential part of the present invention.

A pinion gear 30 is provided on a rotary shaft of the stepping motor 28 so as to mesh with the rack teeth 24 formed on the rack rail 20 as previously described. As a result of the meshing of the pinion gear 30 with the rack teeth 24, the rotation of the stepping motor 28 is converted to a linear movement and the driving force of the stepping motor is transmitted to the head carriage base 13. As a result, the head carriage 11 is moved or transported along the guide rod 21.

The mounting member 29 is constituted from a stepping motor mounting part 29a for mounting the stepping motor 28, a leaf spring mounting part 29b for mounting the leaf spring 25 and a frame mounting part 29c for mounting the member 29 on a frame (not shown) of the apparatus. The stepping motor 28 is mounted on the mounting part 29a using screws 31a and 31b. The leaf spring 25 is mounted on the mounting part 29b as will be described.

The drive unit 12 thus constructed is mounted on the frame of the magnetic recording/reproducing apparatus not illustrated in such a state that the pinion gear 30 is meshed with the rack teeth 24 in the elongated hole 20a and that the respective contacting planes of the head piece 16 and 17 for slide contact with the recording surface of the magnetic disk are extended parallel to the guide rod 21.

Figure 10:
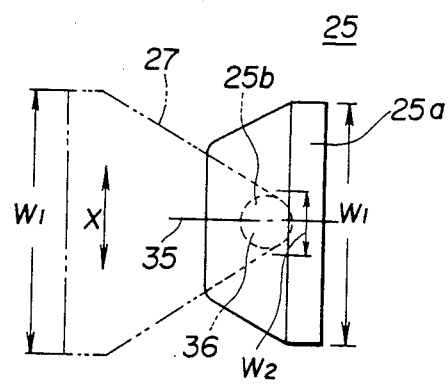
FIGS.10, 11 and 12 are respectively a plan view, a front view, and a side view of a U-shaped leaf spring.
Figure 11:
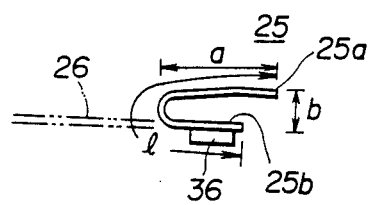
Figure 12:
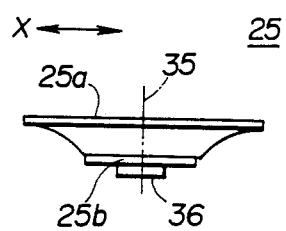

FIGS.10-12 shows the leaf spring 25. The leaf spring 25 has a generally triangular shape as shown in a two-dotted line in FIGS.10 and 11 when expanded, wherein a base part 25a of the triangle has a width $W_1$ which is larger than a width $W_2$ of an apex part 25b of the triangle. The leaf spring 25 may be obtained by bending a thin triangular plate piece 27 of phosphor bronze to a U-shaped form. By configuring the leaf spring 25 as such, the spring 25 has an effective length 1 of a large value while maintaining small outer dimensions a and b. The reference numeral 35 indicates the center line of the leaf spring 25. On the apex part 25b of the spring 25, a disk shaped slide member 36 made of a wear resistant material is mounted. The member 36 may be formed from a fluorocarbon resin such as TEFLON or RULON (registered trade mark).

The mounting part 29b extends over the surface 26. The leaf spring 25 is accommodated in a small space between the leaf spring mounting part 29b and the smooth surface 26 of the rack rail 20 and exerts a force F on the rack of rail 20 such that the rack teeth 24 is urged on the pinion gear 30.

Responsive to the energization of the motor 28, the rack of teeth 24 is driven by the pinion gear 30 and the head carriage 11 is moved towards a direction X under a guidance of the guide rod 21 while maintaining a slide engagement with the member 36. As the smooth upper surface 26 of the rack rail 20 makes the slide engagement with the low friction slide member 36, the movement of the head carriage 11 becomes smooth and the wear is minimized. Thus, the movement of the head carriage 11 remains smooth and reliable for a prolonged time period.

Further, as a result of the rack of teeth 24 being urged against the pinion gear 30 by the force F of the leaf spring 25, the backlash between the rack of teeth 24 and the pinion gear 30 is eliminated and the movement of the head carriage 11 is made accurately.

Next, the leaf spring 25 will be described further in detail. The leaf spring 25 is mounted on the lower side of the spring mounting part 29a such that the center line 26 thereof is perpendicular to the direction of transportation of the head carriage 11 shown by the arrow X, by fixing the base part 25a of the spring 25 on the lower side of the mounting part 29a. With the transportation of the head carriage 11, the apex part of the leaf spring 25 is subjected to a force f which acts in the direction of movement of the head carriage 11 (see FIG.4). However, as the leaf spring 25 is mounted with such an orientation as described, the spring 25 shows a rigidity against the force f acting in the direction X and shows no substantial deformation. As a result, the spring 25 exerts the urging force F which is substantially constant against the rack rail 20 in any circumstances and the transportation of the head carriage is made stably.

It should be noted that by making the piece 27 for exerting the force F such that the leaf spring 25 assumes the triangular shape in its expanded state, the width of the base part 25a of the spring 25 can be made larger than the width of a corresponding edge when the spring 25 is made to have a rectangular shape in the expanded state. By such a triangular construction of the spring 25 or the piece 27, too, the rigidity of the spring 25 is increased. Further, as a result of the triangular shaping of the thin plate piece 27 as such, the bending stress appearing at the various parts of the spring 25 can be made substantially uniform throughout the spring 25, the material of the spring is used efficiently at the time of manufacturing of the piece 27, and it becomes possible to change the vibrational mode of the spring easily so as to avoid the resonance of the leaf spring 25.

As can be seen in FIGS.3 and 4, the leaf spring 25 is positioned such that the slide member 36 is located at a position P immediately above the pinion gear 30. As a result of such a construction, the rack rail 20 receives the force F of the spring 25 at the position P immediately above the pinion gear 30 via the member 36, and the rack of teeth 24 is urged against the pinion gear 30. As a result, the urging state of the rack of teeth 24 against the pinion 30 does not change even if the head carriage 11 is moved. Thus, the head carriage 11 is moved stably and the position thereof is determined accurately.

It should be noted that the aforementioned effect is achieved by the leaf spring 25 having the slide member 36 as the only element attached thereto Thus, the structure of the mechanism 10 is simplified and the number of parts therein can be reduced.

Figure 13:
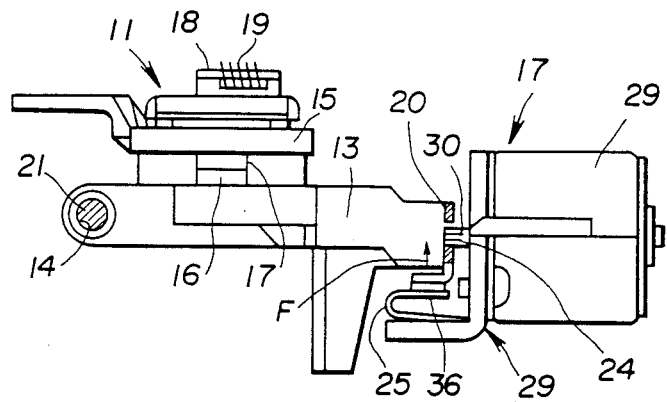
FIG.13 is a front view showing a second embodiment of the head carriage mechanism for a magnetic disk recording and/or reproducing apparatus of the present invention in a state in which a part thereof is sectioned.
Figure 14:
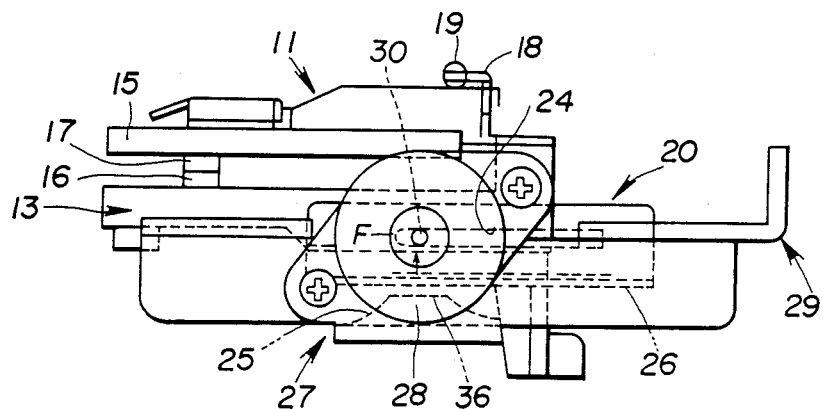
FIG.14 is a side view of the mechanism of FIG.13.

FIGS.13 and 14 show a mechanism 10A which is a second embodiment of the present invention. Referring to the drawings, these parts constructed identically to those corresponding part of FIGS.1 and 3 are given the identical reference numerals and the description thereof will be omitted.

The mechanism 10A differs from the mechanism 10 of FIG.1 in that the rack rail 20 and the urging leaf spring 25 are provided upside down. Thus, the head carriage 11 is urged by the leaf spring 25 by the force F now acting upwards.

Generally, a magnetic disk recording/reproducing apparatus is constructed such that the magnetic disk (not shown) passes the head pieces 16 and 17 from the left to the right in FIGS.1 and 13 when the disk is rotated. As a result of the use of the apparatus for a prolonged time period, there appears a wear between the rack teeth 24 and the pinion gear 30. When such a wear becomes significant, the head carriage 11 the position of which is determined by the engagement of the rack teeth 24 and the pinion gear 30 is tilted slightly to the clockwise direction in the case of the mechanism 10 of FIG.1 or to the counter clockwise direction in the case of the mechanism 10A of FIG.13. Correspondingly thereto, the head piece 16 is also tilted. When such a tilting occurs, the front edge of the lower head piece 16 of the mechanism 10 which engages first with the magnetic disk will project upwards from the plane of rotation of the magnetic disk on the apparatus and collides with the incoming recording surface of the magnetic disk. As the lower head piece 16 is carried by the head carriage base 13 in a state to tilt freely via a thin resilient gimbal plate, the impact of collision of the disk and the head piece provides a damaging effect to the magnetic disk as well as to the head piece 16 and the gimbal plate supporting the head piece 16.

On the contrary, in the case of the mechanism 10A, the direction of tilt of the head piece 16 is in the counterclockwise direction and it is the rear edge of the head piece 16 which engages with the recording surface of the magnetic disk as the head piece projects upwards beyond the plane of rotation of the magnetic disk. In such a situation, the magnetic disk is lifted upwards as a result of the guidance of the contact plane of the head piece 16 and the damage to the magnetic disk as well as to the gimbal plate and the head piece 16 carrying the head piece 16 is avoided.

In the embodiments described heretofore, a fluorocarbon resin is used as the slide member 36. However, the material for the member 36 is not limited to such a fluorocarbon resin but other materials may be used as far as they satisfy the required hardness, low frictional coefficient, wear resistance, and the like.

Further, the present invention is not limited to those embodiments but various variations and modifications may be made without departing from the scope of the present invention.

WHAT IS CLAIMED IS:

1. A head carriage mechanism for carrying a magnetic head of a magnetic recording/reproducing apparatus having a frame and performing a recording and/or reproduction of an information signal on and from a magnetic disk by means of said magnetic head, said magnetic head being defined with a slide surface for contact with a recording surface of the magnetic disk on which the information signal is recorded, comprising:
   a single guide rod fixed on the frame of the magnetic recording/reproducing apparatus;
   a head carriage carrying the magnetic head and having a first side in which said guide rod is passed through such that the head carriage slides over the guide rod freely in a predetermined direction and further rotates freely about the guide rod,
   a rack of teeth provided on the head carriage at a second side opposing said first side,
   a mounting member fixed on said frame,
   a stepping motor provided with a pinion gear and mounted on said mounting member such that the pinion gear is meshed with the rack teeth, said stepping motor being positioned relative to the mounting member such that the slide surface of the magnetic head extends parallel with the recording surface of the magnetic disk,
   a leaf spring configured to have a U-shaped cross section, said leaf spring being mounted on said mounting member such that the leaf spring makes a slide engagement with a part of the head carriage and exerts an urging force on the head carriage so that the rack teeth and the pinion gear are pressed to each, other and
   a wear resistant, low friction slide member provided between said part of the head carriage to which the leaf spring makes the slide engagement with the head carriage and said leaf spring;
   wherein said leaf spring is mounted on the mounting member with such an orientation that the leaf spring extends perpendicularly to said predetermined direction along which the head carriage is slid.

2. A head carriage mechanism as claimed in claim 1 in which said mounting member has a mounting part defined by an inner surface and extending to cover at least a part of the second side of the head carriage from a second direction perpendicular to said first direction so as to define a space between the inner surface of the mounting part and the second side of the head carriage, and wherein said leaf spring is mounted on said inner surface of the mounting part.

3. A head carriage as claimed in claim 1 in which said leaf spring comprises a generally triangular resilient plate member deformed to have the U-shaped cross section, said triangular resilient plate being defined by a base part which corresponds to the base of a triangle, and wherein said leaf spring is mounted on the inner surface of the mounting part with such an orientation that the direction of the base part agrees with the said direction.

4. A head carriage as claimed in claim 3 in which said slide member is mounted in a vicinity of a tip end of the triangular resilient plate.

5. A head carriage as claimed in claim 1 in which said slide member engages a contact with the head carriage at a position of the second side of the head carriage which is opposite to said pinion gear.

6. A head carriage as claimed in claim 1 in which said rack of teeth is formed above said pinion gear and that the leaf spring exerts a force acting downwards.

7. A head carriage as claimed in claim 1 in which said rack of teeth is formed below said pinion gear and that the leaf spring exerts a force acting upwards.

* * * * *